US009754515B2

(12) United States Patent
Nicolis

(10) Patent No.: US 9,754,515 B2
(45) Date of Patent: Sep. 5, 2017

(54) SUPPORT FOR COMMUNICATION ELEMENTS IN POINTS OF SALE OF PRODUCTS

(76) Inventor: Stefano Nicolis, Villafranca di Verona (IT)

( * ) Notice: Subject to any disclaimer, the term of this patent is extended or adjusted under 35 U.S.C. 154(b) by 58 days.

(21) Appl. No.: 14/237,648

(22) PCT Filed: Aug. 3, 2012

(86) PCT No.: PCT/EP2012/065284

§ 371 (c)(1), (2), (4) Date: Feb. 7, 2014

(87) PCT Pub. No.: WO2013/020928

PCT Pub. Date: Feb. 14, 2013

(65) Prior Publication Data

US 2014/0158846 A1 Jun. 12, 2014

(30) Foreign Application Priority Data

Aug. 8, 2011 (IT) .............................. VR2011A0168

(51) Int. Cl.
*G06F 3/18* (2006.01)
*G09F 3/20* (2006.01)
(Continued)

(52) U.S. Cl.
CPC ................ *G09F 3/204* (2013.01); *G09F 3/18* (2013.01); *G09F 3/208* (2013.01); *G09F 7/18* (2013.01);
(Continued)

(58) Field of Classification Search
CPC ..... G09F 3/02; G09F 7/18; G09F 3/08; G09F 3/18; G09F 3/185; G09F 3/20; G09F 3/201; G09F 3/202; G09F 3/204; G09F 3/208; G09F 1/12; A47F 5/0869; A47F 5/0068; G09G 2380/04
USPC .... 248/214, 220.21, 220.22, 222.12, 222.51, 248/223.41, 205.1, 309.1; 40/661.03, 40/661.08, 124.05, 446, 642.01, 642.02,
(Continued)

(56) References Cited

U.S. PATENT DOCUMENTS 3,135,489 A * 6/1964 Gledhill ................... 248/223.41
3,159,937 A * 12/1964 Barnes .................... G09F 3/202 116/322
(Continued)

FOREIGN PATENT DOCUMENTS

EP 0790549 A2 8/1997
EP 2345345 A1 7/2011
(Continued)

OTHER PUBLICATIONS

International Search Report dated Aug. 28, 2012.

*Primary Examiner* — Leslie A Nicholson, III
*Assistant Examiner* — Taylor Morris
(74) *Attorney, Agent, or Firm* — Cooper Legal Group LLC

(57) ABSTRACT

A support (1) for communication elements in points of sale of products comprising a supporting body (2), which can be anchored to the structure of an exhibitor (3) for products and defines at least one coupling region (4) for at least one electronic tag (5), which has at least one face (5*a*) for displaying commercial information; the electronic tag (5) supports engagement means (6) for at least one communication element (7).

9 Claims, 5 Drawing Sheets

(51) Int. Cl.

| | |
|---|---|
| ***G09F 7/18*** | (2006.01) |
| ***G09F 3/18*** | (2006.01) |
| *G09F 3/10* | (2006.01) |
| *A47B 96/06* | (2006.01) |
| *A47F 5/00* | (2006.01) |
| *A47F 5/08* | (2006.01) |
| *A47H 1/10* | (2006.01) |
| *E04G 3/00* | (2006.01) |
| *A47G 29/00* | (2006.01) |
| *A47K 1/00* | (2006.01) |
| *E04G 5/06* | (2006.01) |
| *F21V 21/00* | (2006.01) |
| *F21V 35/00* | (2006.01) |
| *G09F 1/12* | (2006.01) |
| *G09F 3/02* | (2006.01) |
| *G09F 7/08* | (2006.01) |

(52) U.S. Cl.

CPC ........... *A47F 5/0068* (2013.01); *A47F 5/0869* (2013.01); *G09F 1/12* (2013.01); *G09F 3/02* (2013.01); *G09F 3/20* (2013.01); *G09F 3/201* (2013.01); *G09F 7/08* (2013.01); *G09G 2380/04* (2013.01)

(58) Field of Classification Search

USPC ........ 40/654.01, 661.11, 651, 652; 211/57.1, 211/59.1, 86.01, 183

See application file for complete search history.

(56) References Cited

U.S. PATENT DOCUMENTS

| | | | | | |
|---|---|---|---|---|---|
| 4,092,698 | A | * | 5/1978 | Brefka | 361/752 |
| 4,179,138 | A | * | 12/1979 | Bogdanovic | G09F 1/06 248/222.12 |
| 4,888,709 | A | * | 12/1989 | Revesz | G06Q 30/02 340/10.41 |
| RE33,443 | E | * | 11/1990 | Ackeret | G09F 11/30 40/122 |
| 5,470,138 | A | * | 11/1995 | Kump | 312/34.4 |
| 5,967,343 | A | * | 10/1999 | Dufresne | 211/86.01 |
| 6,119,990 | A | * | 9/2000 | Kump et al. | 248/220.22 |
| 6,126,125 | A | * | 10/2000 | Dalton | 248/205.2 |
| 6,367,752 | B1 | * | 4/2002 | Forsythe et al. | 248/220.21 |
| 6,712,324 | B2 | * | 3/2004 | Catteau et al. | 248/222.51 |
| 7,165,349 | B2 | * | 1/2007 | Bauer | 40/654 |
| 2008/0022565 | A1 | * | 1/2008 | Sandy | A47F 7/14 40/124 |
| 2010/0320160 | A1 | * | 12/2010 | Norris | 211/26 |
| 2011/0286195 | A1 | * | 11/2011 | Horikiri et al. | 361/807 |

FOREIGN PATENT DOCUMENTS

| | | | | | |
|---|---|---|---|---|---|
| GB | 2249854 | A | | 5/1992 | |
| JP | 200540334 | | | 2/2005 | |
| WO | WO 2010052994 | A1 | * | 5/2010 | G09F 3/20 |

* cited by examiner

SUPPORT FOR COMMUNICATION ELEMENTS IN POINTS OF SALE OF PRODUCTS

The present invention relates to a support for communication elements in points of sale of products.

The use is known, in points of sale of products, such as supermarkets or other shops in general, of electronic tags which are provided with displays for viewing the price and optionally other information about the products on sale.

Such electronic tags are usually coupled to longitudinally extended profiles which are coupled to the structure of the shelves for displaying the products in the sales point.

In particular, these profiles are provided longitudinally with a coupling seat, in which various electronic tags and optionally other components can be engaged, such as, for example, blocks which are arranged side by side with the electronic tags and are adapted to support, in a cantilever fashion, communication elements constituted typically by plastic-coated cards or the like, which are designed to draw users' attention to further commercial information about the products together with the individual electronic tags.

The drawback of the known art consists in that often the users, by accidentally knocking against the communication elements, can cause a shifting thereof.

As a consequence, the communication elements are distanced from the electronic tag beside which they were arranged, thus creating a situation of confusion for the users, who are no longer in a position to understand exactly which product is referred to by the communication elements.

The aim of the present invention is to solve the above mentioned problems by providing a support for communication elements in points of sale of products which makes it possible to prevent the possibility of confusion for the users.

Within this aim, an object of the invention is to provide a support for communication elements in points of sale of products which is exceptionally simple and practical in use.

Another object of the present invention is to provide a support for communication elements in points of sale of products which makes it possible to associate the products on display not only with an electronic tag but also with various different communication elements, in order to more effectively attract the attention of consumers.

Another object of the present invention is to provide a support for communication elements in points of sale of products which is very simple in structure and low cost.

This aim and these and other objects which will become better apparent hereinafter are achieved by a support for communication elements in points of sale of products, according to the invention, as defined in claim 1.

Further characteristics and advantages of the invention will become better apparent from the description of a preferred, but not exclusive, embodiment of the support according to the invention, which is illustrated by way of non-limiting example in the accompanying drawings, wherein.

Figure 1:
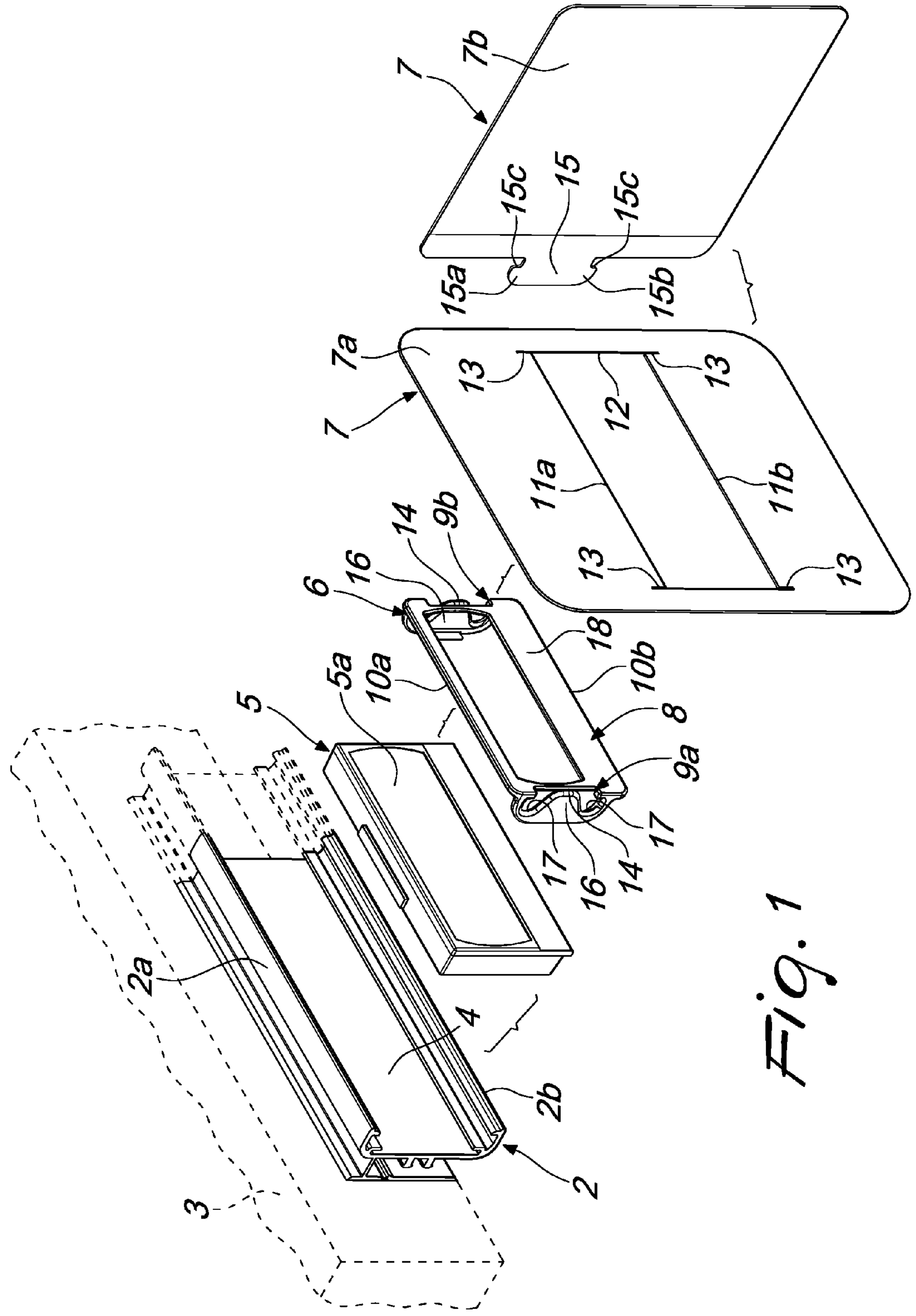
FIG. 1 is an exploded perspective view of a support according to the invention.
Figure 2:
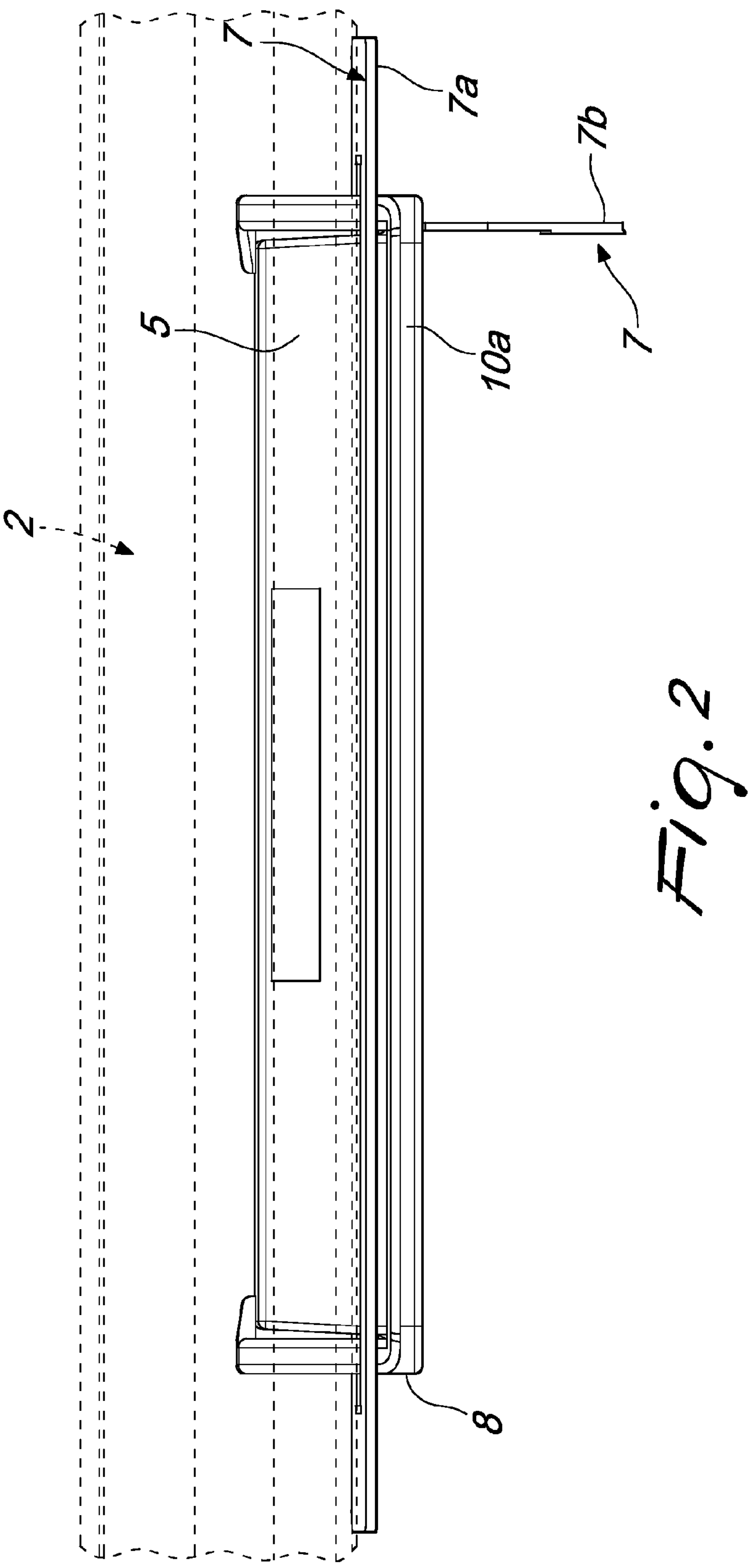
FIG. 2 is a view from above with parts of the support according to the invention shown transparent.
Figure 3:
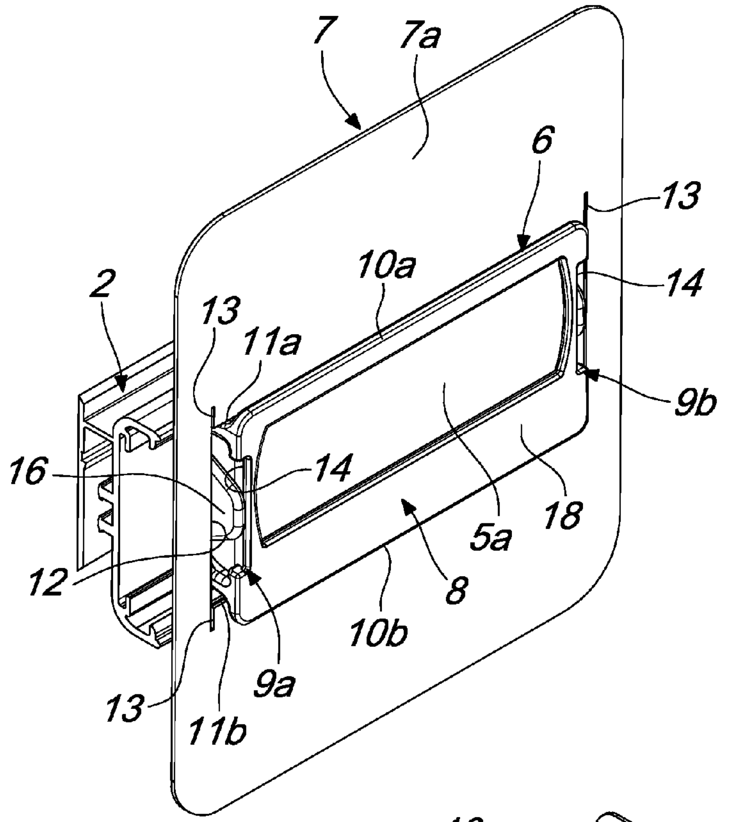
FIG. 3 is a perspective view of the support according to the invention with a first communication element applied.
Figure 4:
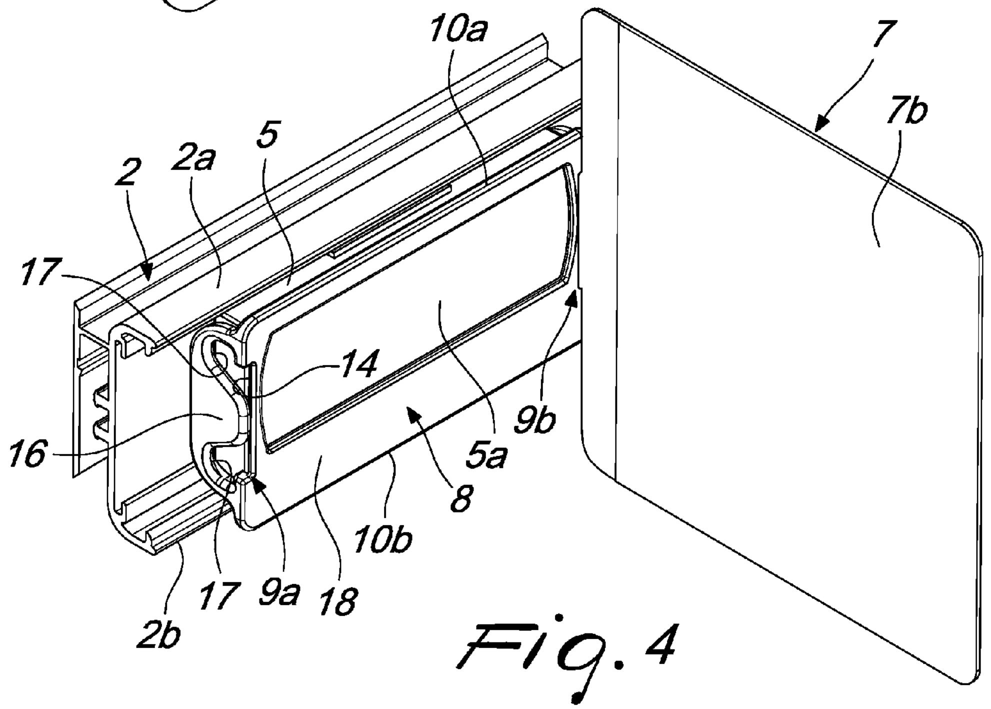
FIG. 4 is a perspective view of the support according to the invention with a second communication element applied.
Figure 5:
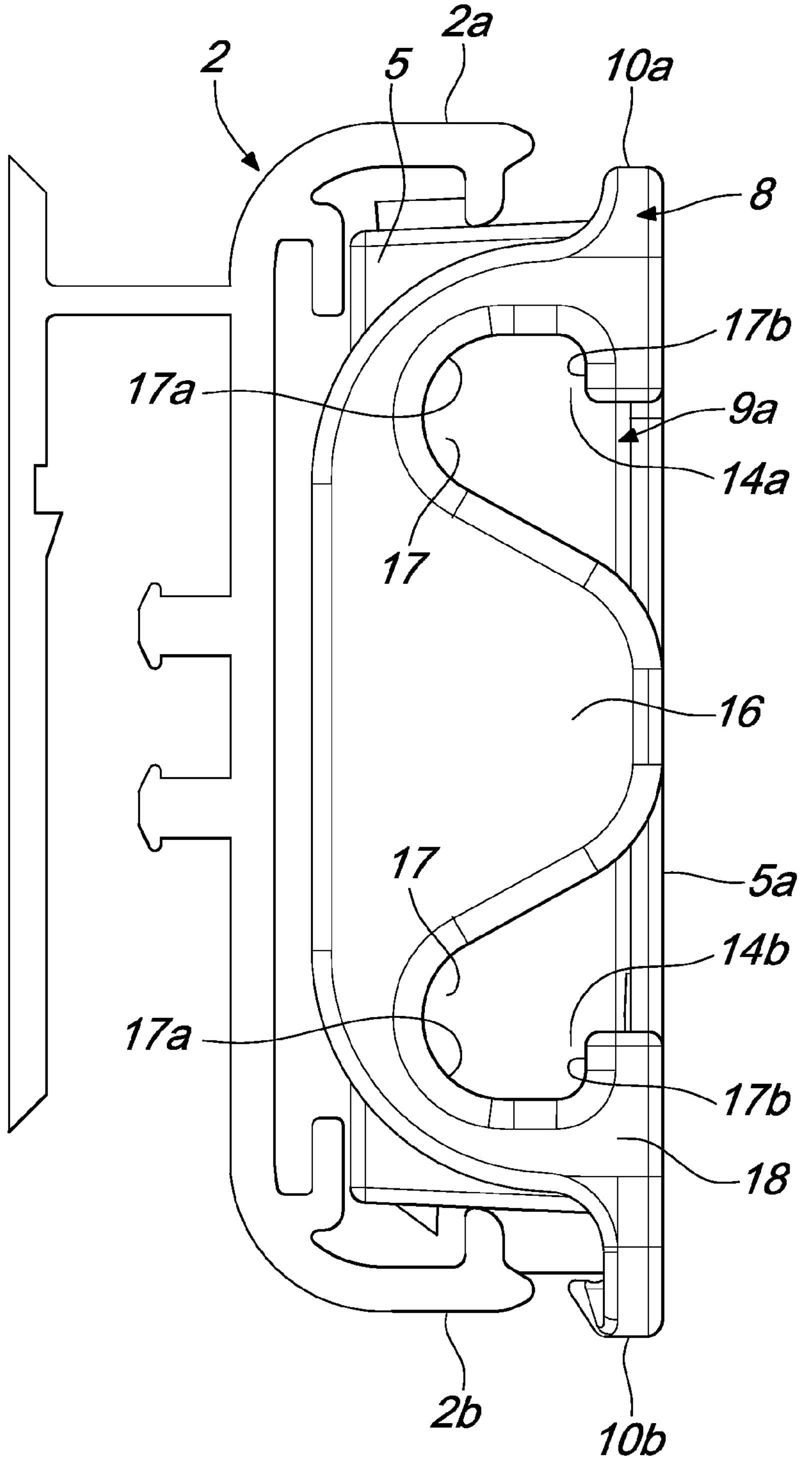
FIG. 5 is a side elevation view of the support according to the invention.

With reference to the figures, the support for communication elements in points of sale of products, according to the invention, generally designated by the reference numeral 1, comprises a supporting body 2, which can be anchored to the structure of an exhibitor 3 for products, such as a shelf or the like, and which defines at least one coupling region 4 for at least one electronic tag 5, on which at least one display face 5*a* is defined, upon which commercial information is shown about the products arranged on the exhibitor 3, such as, typically, the price or the like.

Preferably, but not necessarily, the supporting body 2 comprises a longitudinally extended profiled element, which is designed to be fixed, substantially horizontally, to a shelf of the shelving unit that constitutes the exhibitor 3, and can have, conveniently, two mutually opposite locking wings 2*a*, 2*b*, between which the electronic tag 5 can be engaged.

The peculiarity of the invention consists in that the electronic tag 5 supports engagement means 6 for at least one communication element 7, which bears further information or graphic signs concerning the products on display.

Thanks to such engagement means 6, a connection is achieved between the electronic tag 5 and the communication elements 7 which prevents any possibility of confusion for the users.

As illustrated, each communication element 7 has, preferably, a plate-like structure and, more specifically, can be, for example, constituted by a card, made from plastic-coated cardboard, or by a transparent, flattened envelope, for example made of plastic, in which sheets can be removably inserted containing the commercial information or the graphic signs concerning the products on display.

Conveniently, the means 6 of engagement of the communication elements 7 on the electronic tag 5 can be formed monolithically with the electronic tag 5, i.e. they can be formed directly on the body of the electronic tag 5 during the production thereof, or, as an alternative, they can even be defined, as in the embodiment shown, on an accessory element 8, as will be better described hereinafter, which can be coupled to the electronic tag 5, so as to also be able to provide existing electronic tags with the means 6 of engagement with the communication elements 7.

Advantageously, the engagement means 6 are adapted to support the communication elements 7 with their planes of arrangement arranged substantially parallel to the display face 5*a* of the electronic tag 5, so as to enable them to be read by looking at the front of the display face 5*a* of the electronic tag 5.

In this case, the engagement means 6 are, advantageously, structured to be adapted to enable users to perfectly view both the information shown on the communication element 7 and the information shown on the display face 5*a* of the electronic tag 5.

It is also possible for the engagement means 6 to be capable of supporting communication elements 7 which are arranged with the corresponding plane of arrangement substantially at right angles to the display face 5*a* of the electronic tag 5, so that they are visible to users who pass next to the exhibitor 3 parallel to the display face 5*a* of the electronic tag 5.

Descending into further detail, the engagement means 6 can comprise first engagement means for at least one first communication element, designated in the figures with 7*a*, which is arranged so that its plane of arrangement is substantially parallel to the display face 5*a* of the electronic tag 5.

Advantageously, the engagement means 6 can optionally comprise second engagement means for at least one second communication element, designated with 7*b*, which is arranged so that its plane of arrangement is substantially perpendicular to the display face 5*a* of the electronic tag 5.

More preferably, the engagement means 6 can comprise both first engagement means for at least one first communication element 7*a*, and second engagement means for at least one second communication element 7*b*.

Advantageously, the second communication element 7*b* can be coupled to the second engagement means even when the first communication element 7*a* is already engaged with the first engagement means, so as to be able to simultaneously associate the electronic tag 5 both with communication elements 7 which are arranged, with their plane of arrangement, parallel to the display face 5*a* of the electronic tag 5, and with communication elements 7 which are arranged, with their plane of arrangement, at right angles to the display face 5*a* of the electronic tag 5.

More specifically, the second engagement means comprise, for example, at least two coupling regions 9*a*, 9*b*, which are arranged at mutually opposite sides of the electronic tag 5 and each of which can be engaged by a respective second communication element 7*b*.

Conveniently, the coupling regions 9*a*, 9*b* are arranged substantially at the sides of the electronic tag 5 which are not designed to be engaged by the mutually opposite wings 2*a*, 2*b* for locking the supporting body 2.

Advantageously, the first engagement means comprise at least one pair of locking protrusions 10*a*, 10*b*, which protrude laterally, on mutually opposite sides, with respect to the display face 5*a* of the electronic tag 5 and which are engageable by corresponding mutually opposite edges 11*a* and 11*b* of a window 12, which is defined in the first communication element 7*a* and which can be passed through by the display face 5*a* of the electronic tag 5.

Conveniently, the locking protrusions 10*a*, 10*b* are arranged substantially at the sides of the electronic tag 5 which are not designed to be engaged by the mutually opposite wings 2*a*, 2*b* for locking the supporting body 2.

More specifically, the aforementioned locking protrusions can, advantageously, be formed by at least one first locking protrusion 10*a*, which protrudes upward and is arranged above the display face 5*a* of the electronic tag 5, and by at least one second locking protrusion 10*b*, which protrudes downward and is arranged below the display face 5*a* of the electronic tag 5.

As illustrated, the first locking protrusion 10*a* and the second locking protrusion 10*b* can be engaged by respective edges 11*a*, 11*b*, one upper and the other lower, of the window 12.

In order to enable the engagement of the edges 11*a*, 11*b* with the locking protrusions 10*a*, 10*b*, at least one of the two edges 11*a* and 11*b* of the window 12 is, conveniently, rendered elastically foldable by way of two side cuts 13, defined in the first communication element 7*a*.

Advantageously, in each one of the aforementioned coupling regions 9*a*, 9*b* a slit 14 is defined which can be engaged by a connecting tab 15, which is provided on one side of the second communication elements 7*b*.

In particular, the slit 14 has, on mutually opposite sides, a pair of regions 14*a*, 14*b* which are undercut with respect to the mouth of the slit 14, which can be engaged by respective lateral expansions 15*a*, 15*b*, which are mutually opposite and defined on the connecting tab 15.

Conveniently, the slit 14 is delimited, on a side that is directed outward, by a wall 16 which has, substantially at at least one of the undercut regions 14*a*, 14*b* of the slit 14, a corresponding through opening 17 which makes it possible to insert, or remove, also due to the elastic flexibility of the connecting tab 15, a corresponding lateral expansion 15*a*, 15*b* of the connecting tab 15 in the corresponding undercut region 14*a*, 14*b*, with the other lateral expansion engaged with the other undercut region.

More preferably, in the wall 16 two through openings 17 are provided, each one at a corresponding undercut region 14*a*, 14*b*, in order to render the insertion or withdrawal of the connecting tab 15 into or out of the slit 14 easier.

Conveniently, the shape of the two portions of the edges of the openings 17 which are on mutually opposite sides basically corresponds to the profile of the two lateral expansions 15*a*, 15*b*, with a rounded portion 17*a* which is connected, at the undercut regions 14*a* and 14*b*, with a flat section 17*b* which defines an abutment stop for corresponding flat resting edges 15*c*, which are defined on the lateral expansions 15*a*, 15*b* and are directed toward the respective second communication element 7*b*.

Figure 6:
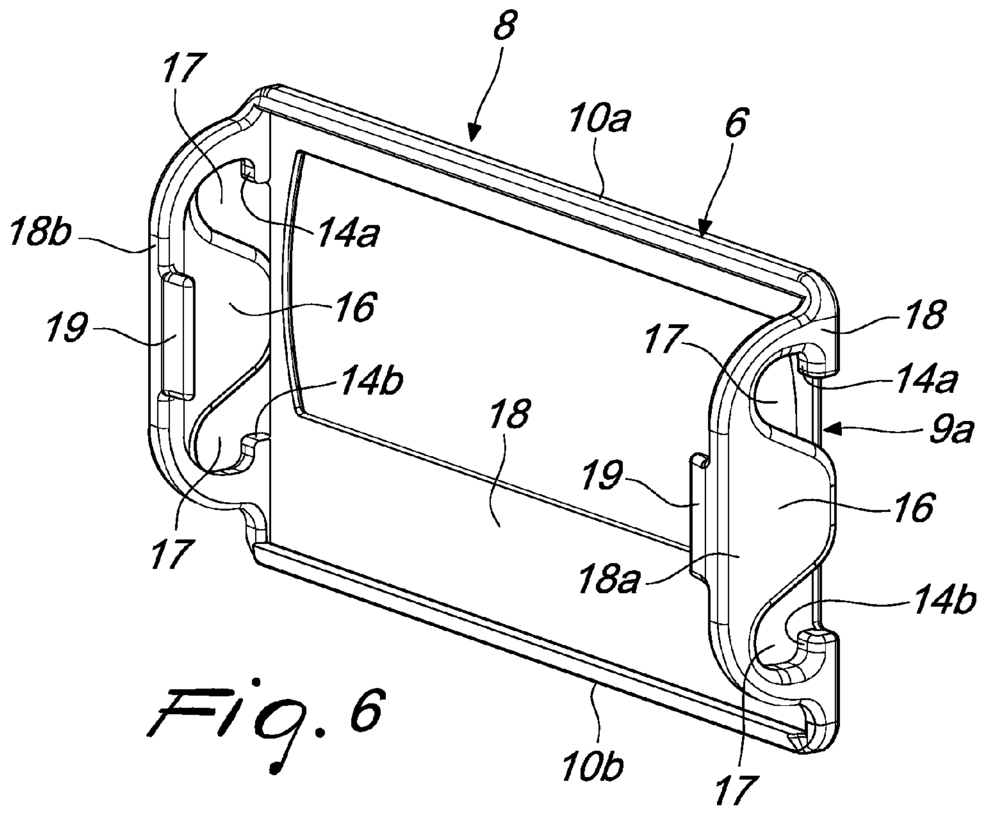
FIG. 6 is a perspective view of an accessory element of the support according to the invention.
Figure 7:
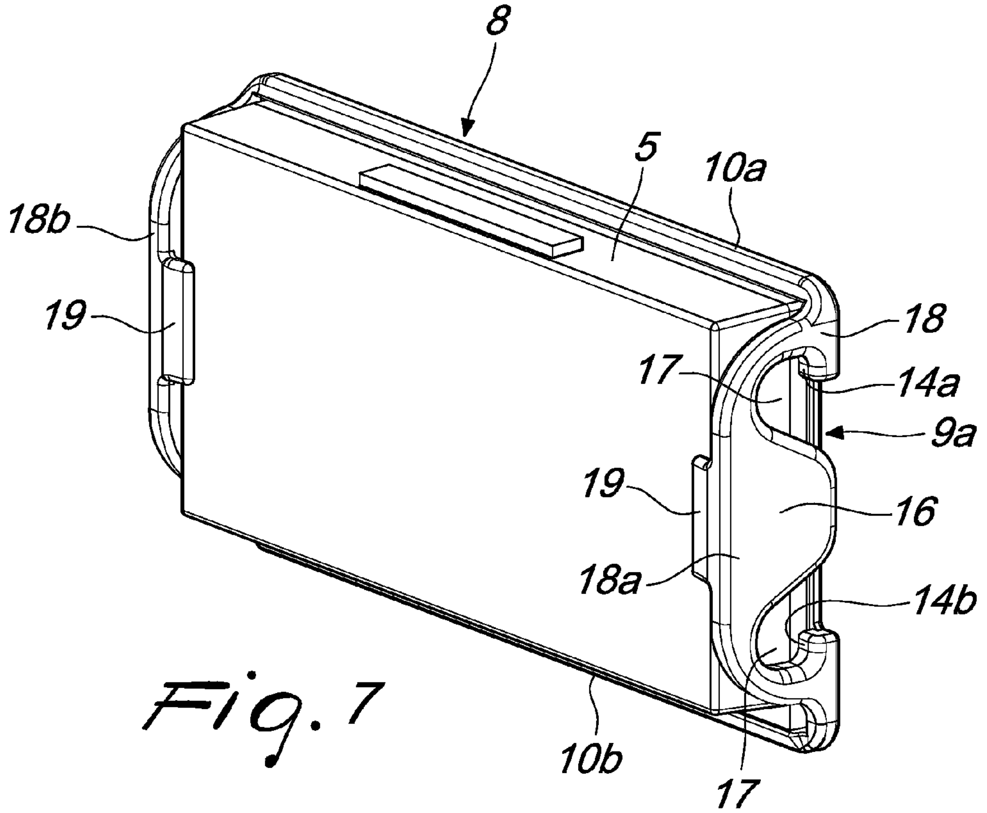
FIG. 7 is a perspective view of the accessory element in FIG. 6, coupled to an electronic tag.

With reference, in particular, to FIGS. 1 and 6, the accessory element 8 comprises a closed frame 18, which is designed to be arranged around the perimeter of the display face 5*a* of the electronic tag 5 and has at least one pair of lateral engagement portions 18*a*, 18*b*, which are elastically flexible and are provided with a respective locking tooth 19, which can engage the face of the electronic tag 5 that lies opposite its display face 5*a*.

In particular, on the two sides of the frame 18 on which the lateral engagement portions 18*a*, 18*b* are present, the coupling regions 9*a*, 9*b* are provided for the second communication elements 7*b*, while on the other two sides the locking protrusions 10*a* and 10*b* are provided.

In this case, when the accessory element 8 is coupled to the electronic tag 5, the slits 14, which are located at the two coupling regions 9*a* and 9*b* which are defined on the accessory element 8, are, conveniently, delimited, on one side, by a corresponding wall 16, which is connected to the corresponding lateral portion of engagement 18*a*, 18*b* of the frame 18, and, on the other side, by the electronic tag 5.

Use of the support according to the invention is the following.

The accessory element 8 is coupled to the electronic tag 5, by snap-fitting, after flexion of the two lateral engagement portions, the two locking teeth 19 onto the face of the electronic tag 5 opposite the display face 5*a*.

The electronic tag 5 with the accessory element 8 applied can be engaged as normal with the supporting body 2, which is fixed to the exhibitor 3 beforehand.

In order to couple a first communication element 7*a* to the electronic tag 5, it is sufficient to engage one of the edges of the window 12, for example the edge 11*a*, against the side of the respective locking protrusion 10*a* which faces in the opposite direction with respect to the display face 5*a*, and push the other edge 11*b* of the window 12, which is rendered elastically foldable by the side cuts 13, against the side of the corresponding locking protrusion 10*b* which is on the same side as the display face 5*a* of the electronic tag 5, until it is forced to fold, with consequent clearing of the corresponding locking protrusion 10*b*.

Substantially opposite maneuvers result in the disengagement of the first communication element 7*a* from the electronic tag 5.

Even with a first communication element 7*a* which has been coupled to the electronic tag 5 beforehand, it is possible to associate at least one second communication element 7*b* with the electronic tag 5, by inserting its connecting tab 15 into the slit 14 of one of the two coupling regions 9*a*, 9*b*.

In order to do this, it is sufficient, first, to introduce one of the lateral expansions 15*a*, 15*b* of the connecting tab 15 into the slit 14, so as to locate it within one of the two undercut regions 14*a*, 14*b*, and then, thanks in part to the elastic flexibility of the connecting tab 15, make the other lateral expansion 15*a*, 15*b* pass into the through opening 17 arranged at the other undercut region of the slit 14, so that it too can be inserted into the slit 14, thus being arranged in the other undercut region 14*a*, 14*b*.

The connecting tab 15 thus remains locked in the slit 14 for its engagement against the wall 16 and for the engagement of the flat resting edges 15*c* of its lateral expansions 15*a*, 15*b* against the flat sections 17*b* which delimit the through openings 17 and the undercut regions 14*a*, 14*b* of the slit 14.

As a consequence, in order to cause the egress of the connecting tab 15 from the slit 14 it is necessary first to flex the connecting tab 15, by acting on the corresponding communication element 7*b*, so as to make one of its lateral expansions 15*a*, 15*b* come out from the through opening 17 of the corresponding undercut region 14*a*, 14*b*, thus achieving the disengagement of the corresponding flat resting edge 15*c* from the corresponding flat section 17*b*, and then to proceed to extract the connecting tab 15 from the slit 14 by way of a simple pulling action exerted on the corresponding communication element 7*b*.

In practice it has been found that the invention is capable of fully achieving the intended aim and objects and, in particular, emphasis is drawn to the fact that the support according to the invention makes it possible to couple communication elements directly to the electronic tag , so as to prevent risks of confusion for the users even in the event of accidental shifting of the communication elements or of the electronic tag.

All the characteristics of the invention indicated as advantageous, convenient or similar may also be missing or be substituted by equivalent characteristics.

The individual characteristics shown with reference to general teachings or to specific embodiments can all be present in other embodiments or substitute characteristics in these embodiments.

The invention, thus conceived, is susceptible of numerous modifications and variations, all of which are within the scope of the appended claims.

In practice the materials employed, as well as the contingent shapes and dimensions, may be any according to requirements.

Moreover, all the details may be substituted by other, technically equivalent elements.

The disclosures in Italian Patent Application No. VR2011A000168 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A support for communication elements in points of sale of products, said support comprising: a supporting body, which can be anchored to a structure of an exhibitor for products and defines at least one coupling region, at least one electronic tag, which has at least one face which is planar for displaying commercial information and which is located at the coupling region of the supporting body, and an engagement means, supported by said at least one electronic tag, for engagement with and retention of at least one communication element, wherein said engagement means comprises first engagement means for engagement with and retention of at least one first planar communication element and retain the at least one first communication element so that the at least one first planar communication element is substantially parallel to the planar display face of said electronic tag and second engagement means being configured to receive a portion of at least one second planar communication element inserted perpendicular to the planar display face of said electronic tag for engagement with and retention of the at least one second planar communication element so that the at least one second planar communication element is substantially perpendicular to the planar display face of said electronic tag, said engagement means being configured such that said second engagement means can engage with and retain said at least one second communication element even when said first engagement means is engaged with and retaining said at least one first communication element.

2. The support according to claim 1, wherein said supporting body comprises a longitudinally extended profiled element.

3. The support according to claim 1, wherein said at least one communication element has a plate-like structure.

4. The support according to claim 1, wherein said engagement means, which comprises the first and second engagement means, are defined on an accessory element which can be coupled to said at least one electronic tag.

5. The support according to claim 4, wherein said accessory element comprises a closed frame, which is designed to be arranged around the perimeter of the display face of said electronic tag and has at least one pair of lateral engagement portions which are elastically flexible and are provided with a respective locking tooth, which can engage the face of said electronic tag that lies opposite its display face.

6. The support according to claim 1, wherein said second engagement means comprise at least two coupling regions which are arranged at mutually opposite sides of said at least one electronic tag and are each engageable by a respective second communication element.

7. The support according to claim 6, wherein each one of said coupling regions comprises a slit which can be engaged by a connecting tab which is provided on one side of the corresponding second communication element, said slit having, on mutually opposite sides, a pair of undercut regions which can be engaged by respective mutually opposite lateral expansions which are defined on said connecting tab.

8. The support according to claim 7, wherein said slit is delimited, on a side that is directed outward, by a wall which has, substantially at least one of said undercut regions, a corresponding through opening, which is adapted to allow the insertion or extraction of a corresponding lateral expansion in the corresponding undercut region, when the other lateral expansion is engaged with the other undercut region.

9. The support according to claim 1, wherein said first engagement means comprise at least one pair of locking protrusions, which protrude laterally, on mutually opposite sides, with respect to the display face of said at least one electronic tag and are engageable by corresponding mutually opposite edges of a window, which is defined in said first communication element and can be passed through by the display face of said electronic tag.

* * * * *